United States Patent Office 3,509,752
Patented May 5, 1970

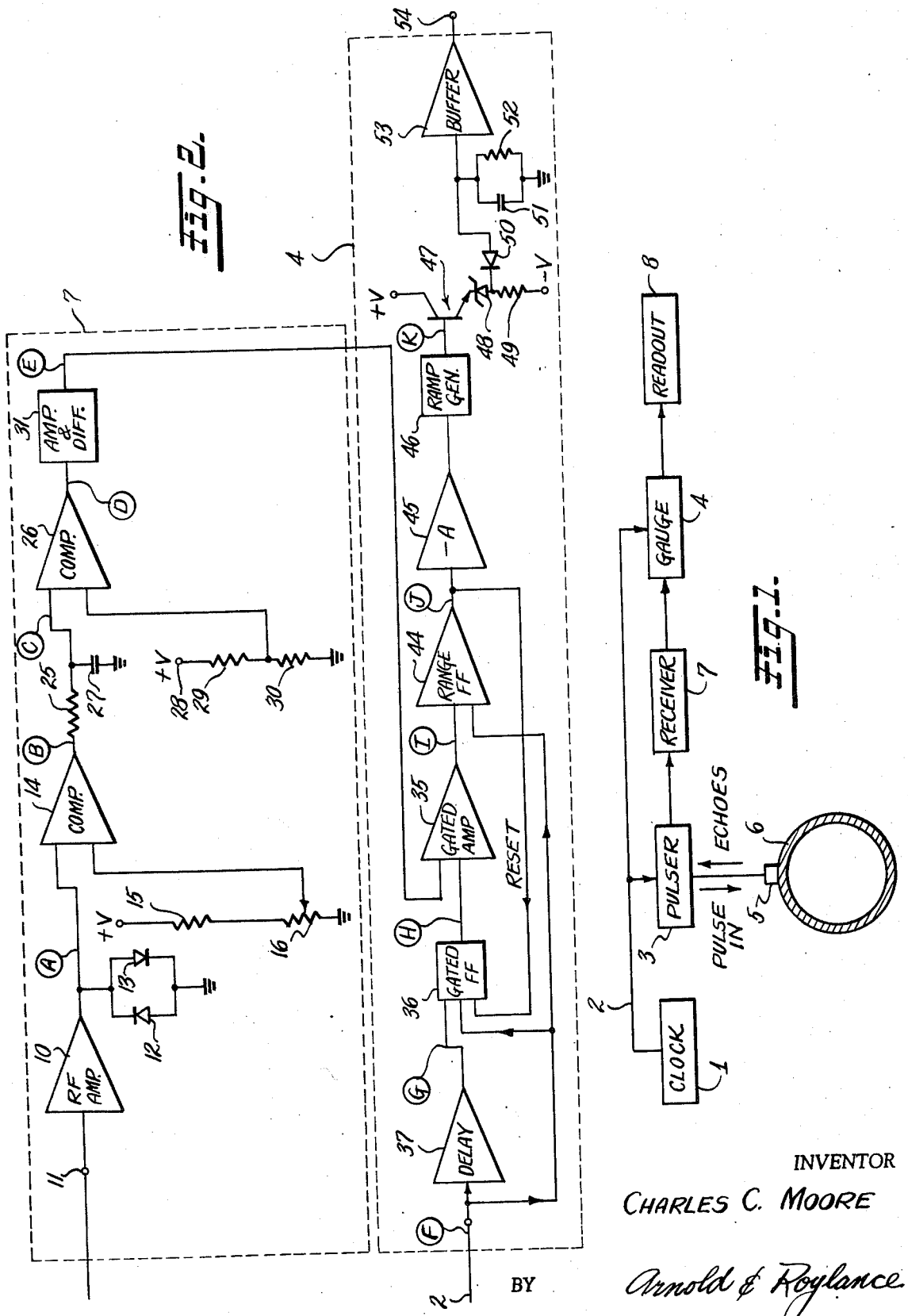

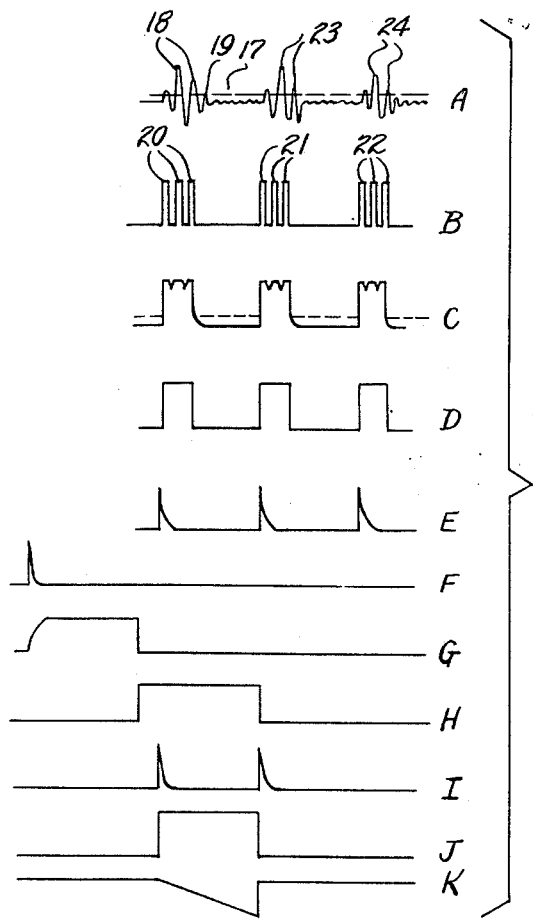
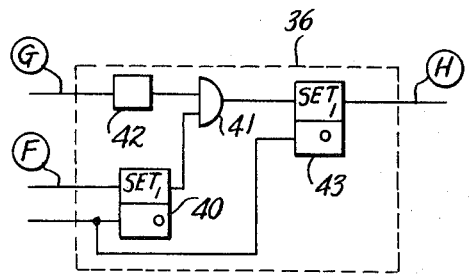
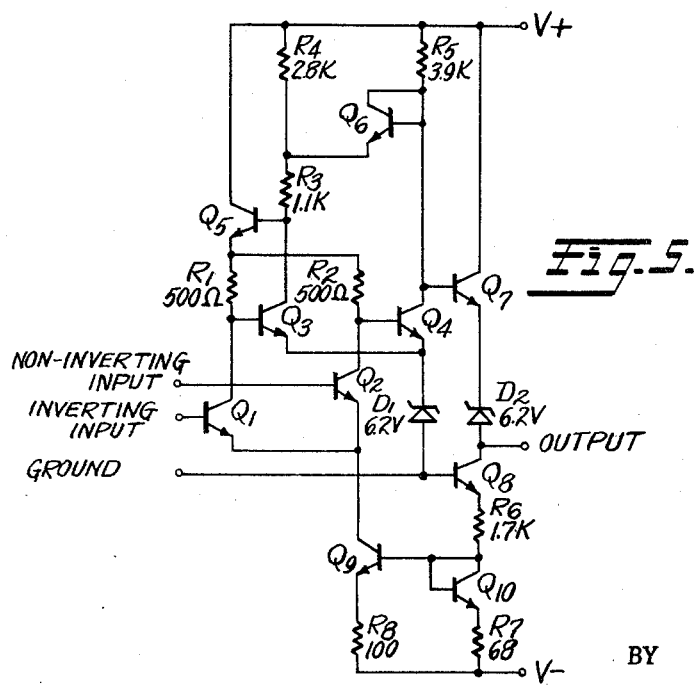

3,509,752
ULTRASONIC THICKNESS MEASURING APPARATUS
Charles C. Moore, Houston, Tex., assignor to American Machine & Foundry Company, New York, N.Y., a corporation of New Jersey
Filed Dec. 30, 1966, Ser. No. 606,091
Int. Cl. G01b *17/02;* G01n *29/04*
U.S. Cl. 73—67.9                                       2 Claims

ABSTRACT OF THE DISCLOSURE

An ultrasonic transducer is energized by a pulser which is triggered by a pulse from a clock pulse source. Wave energy from the transducer enters a test piece. Reflected front and back surface pulses and others are coupled to a receiver which converts the received energy bursts into spaced rectangular pulses which are coupled to a gauge unit. The gauge unit is gated by a clock pulse suitably delayed and allows only the front and back surface pulses to pass. A DC voltage proportional to the spacing between the front and back surface pulses and, hence, the thickness, is generated as the apparatus output.

---

This invention relates to thickness measuring apparatus and more specifically to electrical apparatus for deriving thickness information from the signals developed by an ultrasonic transducer.

In the prior art it is well known to determine the thickness of a test piece, such as the wall of a pipe, by ultrasonic echo techniques. In such apparatus an ultrasonic transducer such as a piezoelectric crystal is acoustically coupled to one surface of the test piece, frequently through a liquid column. An electrical signal of relatively short duration and high intensity is applied to the transducer, creating ultrasonic wave energy which passes through the coupling medium and the test piece and which gives rise to echoes from the front and back surfaces thereof. Each pulse and each echo is generally a burst of ultrasonic frequency energy. The time between the front surface and back surface echoes, or between the transmitted pulse and the back surface pulse with a known-length coupling medium path, is a measure of the thickness of the test piece.

Multiple echoes generally arise during this measuring operation because of plural reverberations between the front and back surfaces and other surfaces in the coupling medium and transducer structure. The resulting electrical signals are therefore complex and it is necessary to determine which signals contain the desired thickness information and which of them should be ignored.

This invention includes an improved solution to the signal processing and analyzing problems inherent in thickness measurement by ultrasonic devices of the type in which a pulse source provides synchronous pulses to the ultrasonic transducer and to a gauge apparatus. The various pulses received by the transducer are converted to electrical signals and delivered to a receiver in the form of bursts of energy. The receiver converts the bursts into rectangular pulses and then to short duration trigger pulses, two of which still bear the same time relationship to each other as did the first significant pulses of the front and back surface echoes. The trigger pulses are then delivered to the gauge apparatus in which the two pulses containing the thickness information are separated from all other pulses. From these pulses the gauge apparatus produces a rectangular pulse and then a DC voltage the magnitude of which is proportional to the thickness of the test piece.

In order that the manner in which the foregoing is attained in accordance with the invention can be understood in detail, reference is made to the accompanying drawings, which form a part of this specification, and wherein:

FIG. 1 is a block diagram of an apparatus in simplified form;

FIG. 2 is a schematic diagram of an apparatus incorporating the invention;

FIG. 3 is a waveform diagram showing electrical signals at various points in the apparatus of FIG. 2;

FIG. 4 is a block diagram of a gated bistable circuit usable in the apparatus of FIGS. 1 and 2; and FIG. 5 is a schematic diagram of a comparator amplifier usable in the apparatus of FIGS. 1 and 2.

FIG. 1 shows in simplified form an apparatus incorporating the invention wherein a clock pulse source 1 provides a continuous train of evenly spaced electrical pulses to a conductor 2 which is connected to a pulser unit 3 and to a gauge unit 4. Pulser unit 3 is a conventional apparatus designed to produce a relatively short duration electrical pulse of high intensity and of a type which will excite an ultrasonic transducer. The pulses provided by source 1 trigger the pulser to provide short pulses of wave energy to a transducer unit 5 which is acoustically coupled to a surface of a test piece 6, shown in FIG. 1 as being a tube or pipe. Transducer 5 performs the function of converting the electrical pulses from pulser 3 into ultrasonic wave energy and of coupling the wave energy into test piece 6. The echoes returning from the various surfaces of test piece 6 are returned through pulser 3 and delivered to the input terminal of a receiver unit 4. The echoes are separated from the high energy initial pulse, the relatively low level echo signals being amplified and limited in amplitude in the receiver circuit. The resulting signals are connected to gauge unit 4 where they are further processed, using the pulses from clock source 1 as a synchronizing signal. Gauge unit 4 further processes the signals to provide a DC output suitable for use in readout device 8 which can be a pen chart recorder or other display or recording apparatus.

The receiver and gauge unit portions of this apparatus are shown in greater detail in FIG. 2, wherein the receiver 7 includes an amplifier 10 which accepts the burst of return energy from the test piece at an input terminal 11 and amplifies these signals. Conventional semiconductor diodes 12 and 13 are connected in parallel circuit relationship between the output terminal of amplifier 10 and ground, the diodes being poled in opposite directions to limit the amplitude of the resulting signals to avoid a signal of excessive amplitude from reaching the later equipment. The amplified signals are connected to one terminal of a voltage comparator amplifier 14. The other input terminal of comparator 14 is connected to an adjustable source of DC reference voltage which includes a fixed resistor 15 and the resistance portion of a potentiometer 16 connected in series circuit relationship between a terminal to which a source of positive DC voltage can be connected and a point of reference potential, shown in FIG. 2 as ground. Comparator circuit 14 is a circuit of the type which provides no output signal until a variable input signal applied thereto rises above a preselected reference voltage level, supplied in this case by the voltage source including resistors 15 and 16. When the input signal from amplifier 10 rises above the reference level, the voltage at the output of comparator circuit 14 rises suddenly and remains at an upper level until the variable input signal again falls below the reference level, at which time the comparator circuit output voltage drops suddenly, the rise and fall times of the output pulse thus generated being very short.

The discussion of the apparatus of FIG. 2, commencing with the comparator circuit, can be understood more easily by referring simultaneously to FIG. 3, waveform A of which shows a typical signal applied to the signal input terminal of comparator circuit 14. In waveform A, the dotted line indicated generally at 17 represents the reference level established by the reference source connected to the reference terminal of comparator circuit 14. It will be noted that in the first burst of energy in wavefor A, three of the four cycles exceed the reference level at the peak points, these cycles being identified at 18. However, the peak at 19 does not reach level 17. As a result, the output of comparator circuit 14, shown in waveform B of FIG. 3, includes three relatively narrow rectangular pulses 20 which are the result of the cycles 18 which rise above the reference level and which therefore cause comparator circuit 14 to produce an output. Similar groups of rectangular pulses 21 and 22 in waveform B are seen to result from energy bursts 23 and 24 in waveform A. It will be noted that the leading edge of the first pulse in each of groups 20, 21 and 22 coincide closely with the leading edges of the first significant pulse in each of energy bursts 18, 23 and 24 and, more importantly, that the time spacing between the leading edge of the first significant pulses of bursts 18 and 23 is the same as the time spacing between the leading edge of each of pulse groups 20 and 21. It can be assumed, for purposes of this discussion, that bursts 18 and 23 represent echoes from the front and back surfaces, or outer and inner surfaces, of the test piece and that the time spacing between the leading edges of these bursts represents the thickness of the test piece at the particular point to which the transducer is acoustically coupled.

The pulse groups from comparator circuit 14 are connected by a resistor 25 to the signal input terminal of a second comparator circuit 26, a capacitor 27 being connected between the signal input terminal and ground. Resistor 25 and capacitor 27 act as a filter which begins to eliminate the gap between successive pulses in a given group, the result of the filtering being seen at waveform C in FIG. 3. It will be noted that the filter circuit does not change the time spacing between the leading edges of successive pulse groups, although the trailing edge is no longer characterized by a rapid fall time.

Comparator circuit 26 performs in a manner similar to comparator circuit 14, the reference input terminal of circuit 26 being connected to a source of reference voltage including a terminal 28 to which a source of positive DC voltage can be connected and fixed resistors 29 and 30 connected between terminal 28 and ground. The reference terminal of comparator 26 is connected to the junction between two fixed resistors. Thus, when the signal at the signal input terminal exceeds the reference voltage level, the voltage at the output terminal rises suddenly and remains at the higher level until the signal input voltage again falls below that level, the output of comparator circuit 26 being shown in waveform D of FIG. 3. It will be noted that waveform D includes rectangular pulses each substantially equal in width to each pulse group of waveform B, the leading edges of each two successive pulses being spaced in time by the same time spacing as were the leading edges of the first significant cycles of each pulse group in waveform A.

The output of comparator circuit 26 is amplified and differentiated to produce relatively short duration spikes as shown in waveform E, the leading edge of each spike having a very short rise time, each leading edge still bearing the same time relationship to the other pulses in the train as existed in the original waves. The series of spikes as shown in waveform E constitutes the output of the receiver unit this output being connected to one input of gauge unit 4 which is the signal input terminal of a gated amplifier 35. The gate input terminal of amplifier 35 is connected to the output of a gated bistable, or flip-flop circuit 36, which has three input terminals, one input terminal being connected to the output of a delay amplifier 37. The input to delay amplifier 37 is the clock pulse delivered on conductor 2 and shown in waveform F of FIG. 3, this pulse being provided by pulse source 1. The clock pulse is also provided to the second input of the gated bistable circuit 36, the third input being a reset signal.

Circuit 36 is of a type which requires a first input pulse to establish an initial condition and then a second input pulse to initiate an output pulse from the circuit. This operation can be performed with many arrangements of conventional logic circuit elements, one of which is shown in FIG. 4 wherein a first conventional bistable circuit 40 is provided with the clock pulse input F at the set input terminal which places the bistable in its SET state, thereby providing a positive output to one input terminal of a conventional AND circuit 41. The clock pulse also initiates an output from delay circuit 37 which is a positive going pulse of predetermined duration such as can be produced by a conventional monostable multivibrator. The output of delay circuit 37 is shown in waveform G of FIG. 3, this pulse being provided to the input terminal of a conventional NOT circuit 42 in circuit 36. The output of NOT circuit 42 is essentially the reverse of waveform G with the absolute level changed so that the trailing edge of the pulse in waveform G is a positive going pulse. This is provided to the other input terminal of AND circuit 41, completing the necessary condition to cause an output from the AND circuit. This output is connected to the set input of a conventional bistable circuit 43 which then changes to its SET state, initiating a pulse as shown in waveform H of FIG. 3. Waveform H is the output of circuit 36 and the input to gated amplifier 35.

Amplifier 35 includes a conventional amplifier which is rendered inactive unless a gate signal such as that shown in waveform H of FIG. 3 is provided to its gate terminal. During the gate signal any pulses provided to the input signal terminal, such as those shown in waveform E, are amplified, the output then including the pulses shown in waveform I. It will be recognized that only two of the pulses from waveform E have passed the gated amplifier stage, these pulses being those which represent the thickness of the test piece by the time spacing between the leading edges of the two spikes. These two pulses constitute the SET and RESET pulses for a range flip-flop circuit 44 which produces a positive going rectangular pulse the duration of which is equal to the time spacing between the leading edges of the two spikes. The trailing edge of this rectangular pulse is fed back to the RESET input of circuit 36 to reset bistable circuits 40 and 43 therein, thus terminating the gate pulse shown in waveform H.

The rectangular pulse shown in waveform J is inverted by an inverting amplifier 45 and is then provided to a ramp generator circuit 46 which is capable of providing an output voltage which linearly increases with time, the time being initially established by the leading edge of the range flip-flop output pulse and being terminated by the trailing edge of that same pulse. It will therefore be seen that the voltage obtained by the ramp generator is purely a function of time and, because the time span is established by waveform J which is a function of test piece wall thickness, the voltage attained by the ramp generator is directly proportional to test piece wall thickness. This ramp voltage is connected to the base electrode of a conventional NPN transistor indicated generally at 47 which acts as an isolating amplifier between the ramp generator and succeeding circuitry. The collector electrode of transistor 47 is connected to a positive DC source, and the emitter electrode is connected to a series circuit including a Zener diode 48 and a fixed resistor 49, the other end of the series circuit being connected to a negative DC source. The cathode of a conventional semiconductor diode 50 is connected to the junction between Zener diode 48 and resistor 49, the anode being connected to a long time constant RC network including a capacitor 51 and a resistor 52 connected in parallel circuit relationship between the diode anode and ground. Diode 50 acts as a holdoff diode to allow the ramp voltage to charge capacitor 51, the value of resistor 52 being sufficiently large to prevent the capacitor from rapidly discharging. Thus, the peak voltage attained by the ramp generator is stored on capacitor 51 and provided to the input terminal of a buffer amplifier 53 as a slowly varying DC voltage representative of the thickness of the test piece. Buffer amplifier 53 acts to provide this DC voltage in a usable form to an output terminal 54 which can be connected to a utilization device such as a strip chart recorder or the like.

A voltage comparator circuit of the type usable as circuits 14 and 26 in FIG. 2 is shown in greater detail in FIG. 5. This is a conventional circuit available from Fairchild Semiconductor, a division of Fairchild Camera and Instrument Corporation, and is identified as a high speed, differential comparator Model μA710C. The details of this circuit constitute no part of the present invention, and a discussion thereof is therefore unnecessary.

While certain advantageous embodiments have been chosen to illustrate the invention, it will be understood by those skilled in the art that various changes and modifications can be made therein without departing from the scope of the invention as defined in the appended claims.

What is claimed is:

1. In an ultrasonic apparatus for determining the thickness of a test piece, the apparatus including transducer means acoustically coupled to an accessible surface of the test piece, said transducer receiving energizing electrical pulses and converting them to pulses of ultrasonic frequency energy which are directed into the test piece, the apparatus also including receiver circuit means for receiving reflected pulses of ultrasonic energy from said test piece, each pulse of ultrasonic energy being comprised of a number of cycles of ultrasonic vibrations, the time spacing between the leading edges of two successive ones of the reflected pulses of ultrasonic energy being a function of the thickness of the test piece, said receiver circuit comprising, a first comparator circuit coupled to receive received signals corresponding to reflected pulses of ultrasonic energy, said received signals being comprised of a number of cycles corresponding to cycles of the ultrasonic energy, means providing a D.C. reference voltage which is coupled to said comparator circuit for establishing a reference voltage level for said comparator circuit, said comparator circuit operating in response only to the cycles of the received signals which exceed said reference voltage level for producing in response thereto uniform amplitude cycle pulses corresponding to the respective cycles of the received signals having amplitudes above said reference voltage level, filter means for forming into a single pulse the cycle pulses of a received signal from said comparator circuit, a second comparator circuit coupled to receive the output of said filter means, means providing a second D.C. reference voltage which is coupled to said second comparator circuit for establishing a reference voltage level for the comparator circuit, the second comparator operating to produce output pulses whose leading edges suddenly rise to a high level when a corresponding pulse from the filter means exceeds said second reference voltage, and means responsive to the output of the second comparator circuit for providing spike pulses in response to the leading edges of output pulses from the second comparator circuit.

2. The combination claimed in claim 1 and further including, means including ramp generator means for imitating a ramp voltage in response to a first spike pulse and terminating said ramp voltage in response to a second spike pulse, whereby the magnitude of the ramp voltage is a function of the thickness of said test piece.

References Cited

UNITED STATES PATENTS

| | | | |
|---|---|---|---|
| 3,334,622 | 8/1967 | Brech | 128—2 |
| 3,287,963 | 11/1966 | Stanya et al. | 73—67.9 |
| 3,280,622 | 10/1966 | Carlin | 73—67.9 |
| 3,169,393 | 2/1965 | Stebbins | 73—67.9 |
| 3,053,080 | 9/1962 | Colten et al. | 73—67.9 |
| 3,006,184 | 10/1961 | Goldman | 73—67.8 |
| 2,672,392 | 3/1954 | Caples et al. | 346—33 |

RICHARD C. QUEISSER, Primary Examiner

J. P. BEAUCHAMP, Assistant Examiner